United States Patent
Brand (10) Patent No.: US 6,864,897 B2
(45) Date of Patent: Mar. 8, 2005

(54) ANALYSIS, SYNTHESIS AND CONTROL OF DATA SIGNALS WITH TEMPORAL TEXTURES USING A LINEAR DYNAMIC SYSTEM

(75) Inventor: Matthew E. Brand, Newton, MA (US)

(73) Assignee: Mitsubishi Electric Research Labs, Inc., Cambridge, MA (US)

(*) Notice: Subject to any disclaimer, the term of this patent is extended or adjusted under 35 U.S.C. 154(b) by 213 days.

(21) Appl. No.: 10/121,785

(22) Filed: Apr. 12, 2002

(65) Prior Publication Data

US 2003/0193509 A1 Oct. 16, 2003

(51) Int. Cl.$^7$ ............................................. G09G 5/00
(52) U.S. Cl. ....................... 345/582; 382/108; 382/285; 345/583; 345/586
(58) Field of Search ........................ 345/582; 701/29; 702/17, 196

(56) References Cited

U.S. PATENT DOCUMENTS

| | | | | |
|---|---|---|---|---|
| 5,774,129 A | * | 6/1998 | Poggio et al. | 345/441 |
| 6,026,334 A | * | 2/2000 | Kayihan et al. | 700/28 |
| 6,373,033 B1 | * | 4/2002 | de Waard et al. | 219/497 |
| 6,532,454 B1 | * | 3/2003 | Werbos | 706/14 |
| 6,643,569 B2 | * | 11/2003 | Miller et al. | 701/29 |
| 6,760,488 B1 | * | 7/2004 | Moura et al. | 382/285 |
| 2002/0093503 A1 | * | 7/2002 | Nougaret et al. | 345/474 |

FOREIGN PATENT DOCUMENTS

| | | | |
|---|---|---|---|
| JP | 04074985 | * 3/1992 | G01S/3/86 |

OTHER PUBLICATIONS

Brand, M. "Subspace Mappings for Image Sequences" MERL—A Mitsubishi Electric Research Laboratory, TR–2—2–25, May 2002.*

Nishino, K., Sato, Y., Ikeuchi, K., "Eigen–Texture Method: Appearance Compression Based on 3D Model" IEEE Transactions on Pattern Analysis and Machine Intelligence, vol. 23, No. 11, Nov. 200, pp 1257–1265.*

Szummer et al., "Temporal texture modeling," *IEEE International Conference on Image Processing*, 1996.

Soatto et al. "Dynamic textures," *Intl. Conf. on Computer Vision*, 2001.

Wei et al., "Fast texture synthesis using tree–structure vector quantization," *Proc., SIGGRAPH 2000*, pp. 479–488, 2000.

Efros et al., "Image quilting for texture synthesis and transfer," *Proc., SIGGRAPH 2001*.

Hertzmann et al. "Image Analogies," *Proc., SIGGRAPH 2001*.

Brand et al., "Style machines, " *SIGGRAPH 2000*.

* cited by examiner

*Primary Examiner*—Matthew C. Bella
*Assistant Examiner*—A Brautigam
(74) *Attorney, Agent, or Firm*—Dirk Brinkman; Andrew J. Curtin (57) ABSTRACT

A method generates a synthetic textured data signal by first acquiring a time-invariant input textured data signal. The input textured data signal is sampled to construct an observation matrix. The observation matrix is eigen-coding and factoring to identify a linear dynamic system modeling the input textured data signal. Then, the linear dynamic system can be run forward from an initial state using a quadratic regulator and a random noise signal to generate the synthetic textured data signal.

11 Claims, 3 Drawing Sheets

ANALYSIS, SYNTHESIS AND CONTROL OF DATA SIGNALS WITH TEMPORAL TEXTURES USING A LINEAR DYNAMIC SYSTEM

FIELD OF THE INVENTION

This invention relates generally to processing data signals, and more particularly to synthetically generating and controlling temporal textures signals.

BACKGROUND OF THE INVENTION

A time-invariant linear dynamical system (LDS) models a process differentially with a time-indexed hidden state vector $x_t$ that evolves according to a system matrix A, input data $u_t$, and a Gaussian noise source $$\gamma \sim N\left(0, \sum_\gamma\right):$$

$$x_{t+1} \leftarrow Ax_t + Bu_t + \gamma_t.$$

An synthetic signal $y_t$ is generated by an output matrix C, feed-through a matrix D, and a Gaussian noise source $$\psi \sim N\left(0, \sum_\psi\right):$$

$$y_t \leftarrow Cx_t + Du_t + \psi_t.$$

Geometrically, an LDS can be described as follows. The state vector x is a point in a high-dimensional space. The point makes a quasi-regular orbit around the origin, under the influence of the system matrix A, the input data, and noise. The output matrix C projects that point onto a space of output data.

The system matrix A defines a gradient in state space. If the system is stable, then the gradient from every point can be followed to an attractor, typically spiraling in to the origin, but also possibly falling into a limit cycle or a fixpoint. Therefore, noise and the input data play an important role in varying the behavior of the LDS and keeping the dynamics of the system from collapsing to extinction at the origin.

With a higher-dimensional state, the system matrix combines with noise to produce richer and more complicated orbits, because with more degrees of freedom, noise has a higher probability of moving the state away from a steady-state attractor. If just one channel or dimension of the state is plotted over time, then the simple cyclic nature of the LDS is quite apparent. However, if one channel is plotted against another, the resulting curve can be quite complex.

The channels of an LDS behave as a set of coupled harmonic oscillators. Each channel has its own resonant frequency but its phase is constantly adjusted via couplings to other channels. The system is forced by noise and the input data, and is typically self-damping. This is a good match to many natural quasi-periodic processes, for example, the semi-pendular motion of body limbs, the sway of tree branches and grasses in the wind, or many sound effects such as a crackling fire, babbling brook, babbling crowd babble, or rustling wind.

Remarkably, LDS-modeling also provides very good approximations of controlled motion such as speech articulation, turbulent motion of liquids and vapors, and even the Brownian agitation of particles and crowds. In those cases, the dynamics of the system are only approximately linear, but the LDS approximation can be improved by increasing the dimensionality of the LDS state vector.

Perhaps the most important observation about the widespread applicability of LDS is that regardless of how a natural phenomenon is recorded, e.g., as acoustic signals, images, motion parameters, etc., an LDS is a good model as long as the input data have a representation that highlights an oscillatory nature.

Of special interest are processes whose outputs can be observed as video, audio, or motion capture. The inputs to these processes are unknown, but can be assumed to have a quasi-periodic structure and can be modeled as part of the system. Thus, a simplified time-invariant LDS can be modeled by:

$$x_{t+1} \leftarrow Ax_t + \gamma_t, \text{ and}$$

$$y_t \leftarrow Cx_t + \psi_t.$$

LDS and equivalent models, e.g., Kalman filters and autoregressive moving averages, have been used extensively in many fields. The applicability of LDS to texture modeling has been noted anecdotally, but until recently, mathematical and computational hurdles have made it impossible to model high-dimensional linear dynamic systems.

Video modeling was first developed using ARMA models of small image patches by Szummer et al., "Temporal texture modeling," *IEEE International Conference on Image Processing*, 1996. A good understanding of system identification methods needed for large-scale modeling was described by Overschee et al., "Subspace algorithms for the stochastic identification problem," *Automatica*, 29(3) :649–660, March 1993, and de Morr et al., "*Applied and Computational Control, Signals and Circuits*," Chapter, 'Numerical algorithms for subspace state space system identification—An Overview', pages 247–311, Birkhauser Books, 1999, and more recently by Soatto et al. "Dynamic textures," *Intl. Conf. on Computer Vision*, 2001. They described a no-inputs variant of a subspace method, see Doretto et al., "Dynamic data factorization," Technical Report TR2001-0001, UCLA Computer Science, 2001.

Those varied methods share some limitations. They use weak finite-data approximations that lead to unnecessary reconstruction errors. They can be numerically unstable for short sequence of high-dimensional data, e.g., a video sequence. In practice, they can yield mismatched estimates of the dynamics and noise, which cause the state to collapse to zero within a few hundred frames of synthesis, producing meaningless output data.

In the field of computer graphics, the currently favored methods for texture synthesis work by montaging pieces of the original texture while minimizing error at the seams e.g., Wei et al., "Fast texture synthesis using tree-structure vector quantization," *Proc., SIGGRAPH* 2000, pages 479–488, 2000, Efros et al., "Image quilting for texture synthesis and transfer," *Proc., SIGGRAPH* 2001, 2001 and U.S. patent application Ser. No. 09/798,147, "Texture Synthesis and Transfer for Pixel Images, filed on Mar. 2, 2001 by Efros et al., and Hertzmann et al., "Image analogies," *Proc., SIGGRAPH* 2001, 2001.

Other techniques for texture synthesis include a Markov chain (MC) method of Schodl et al., "Video textures," *Proc., SIGGRAPH* 2000, pages 489–498, 2000, and a hidden Markov model (HMM) method of Brand et al., "Style machines," *SIGGRAPH* 2000, 2000 and U.S. patent application Ser. No. 09/426,955, "Stylistically Variable State Space Models for Dynamic Systems, filed by Brand on Oct. 26, 1999. The MC method essentially shuffles the original sequence so that successive samples are similar. The outputs are the inputs, re-ordered but not necessarily dynamically related. Schodl et al. use random walks on the Markov chain to synthesize sequences of reasonably periodic or "loopy" phenomena, e.g., a child on a swing, or a candle flame.

The hidden Markov model defines hidden states roughly corresponding to subsequences, and an objective function giving the most likely observation sequence with respect to a hidden state sequence. Brand et al. perform a random walk on the hidden state and then solve the resulting objective function for the most dynamically and configurally probable sequence. They use this to synthesize motion-capture dance performances from random walks on the HMM. HMM modeling offers dynamical modeling and sample generativity, i.e., the synthetic samples are linear combinations of the original samples, but it runs the risk of synthesizing invalid configurations. Moreover, analysis, i.e., estimating the HMM, and synthesis are time consuming and data-intensive batch-mode operations.

Therefore, it is desired to provide a method which deals with a particularly hard modeling case, namely, the case where the behavior of the data-generating system itself is modulated by an unpredictable independent process, so that the outputs of the system are "random variations on a theme." In addition, the data have hidden structure necessitating latent variable models, and the data are, of course, biased and noisy.

In addition, it is desired to provide a method that incorporates solution to the problems stated above. The method needs to yield efficient processes for determining robust, adaptable models for complex dynamical systems, and the models should allow synthesis and control of complex textured signals with high levels of detail.

SUMMARY OF THE INVENTION

The invention provides a method for analyzing time-invariant, textured data to identify a linear dynamic system (LDS) that models the input data. The linear dynamic system is then randomly controlled to synthesize novel textured data that are substantially indistinguishable from the input data.

Described is a method for system identification, that is estimating a system matrix A and an output matrix C from input data samples, and optimal control, that is selecting inputs, in this case, manipulations of a noise channel, to generate and control realistic textured output data.

The invention provides a closed-form solution for system identification from data that are tailored for high-quality synthesis via random walks on the LDS. The method according to the invention can control the LDS through keyframes that maximizes the realism of intervening frames. The invention provides invertible representations of motion, sound, and video texture that enable high-quality modeling with an LDS.

The invention addresses a problem endemic to any dynamical modeling method, an LDS models dynamics but is ignorant about valid configurations. For this, a new synthesis method is provided, which combines an optimal quadratic regulator with information about probable and improbable parts of a configuration space.

The LDS-based method according to the invention offers a middle ground: good dynamics, sample generativity, protection against invalid configurations, robust estimation from short sequences, and real-time synthesis. The LDS is usually quite compact, often the size of 10–100 samples, depending on the complexity of the process. With very small storage, the LDS can generate very long non-repetitive sequences in which every synthetic frame is unique. The method is useful for video games, and for the generation of complex scenes combining hundreds or thousands of video/audio/motion textures.

DETAILED DESCRIPTION OF THE PREFERRED EMBODIMENT

Figure 1:
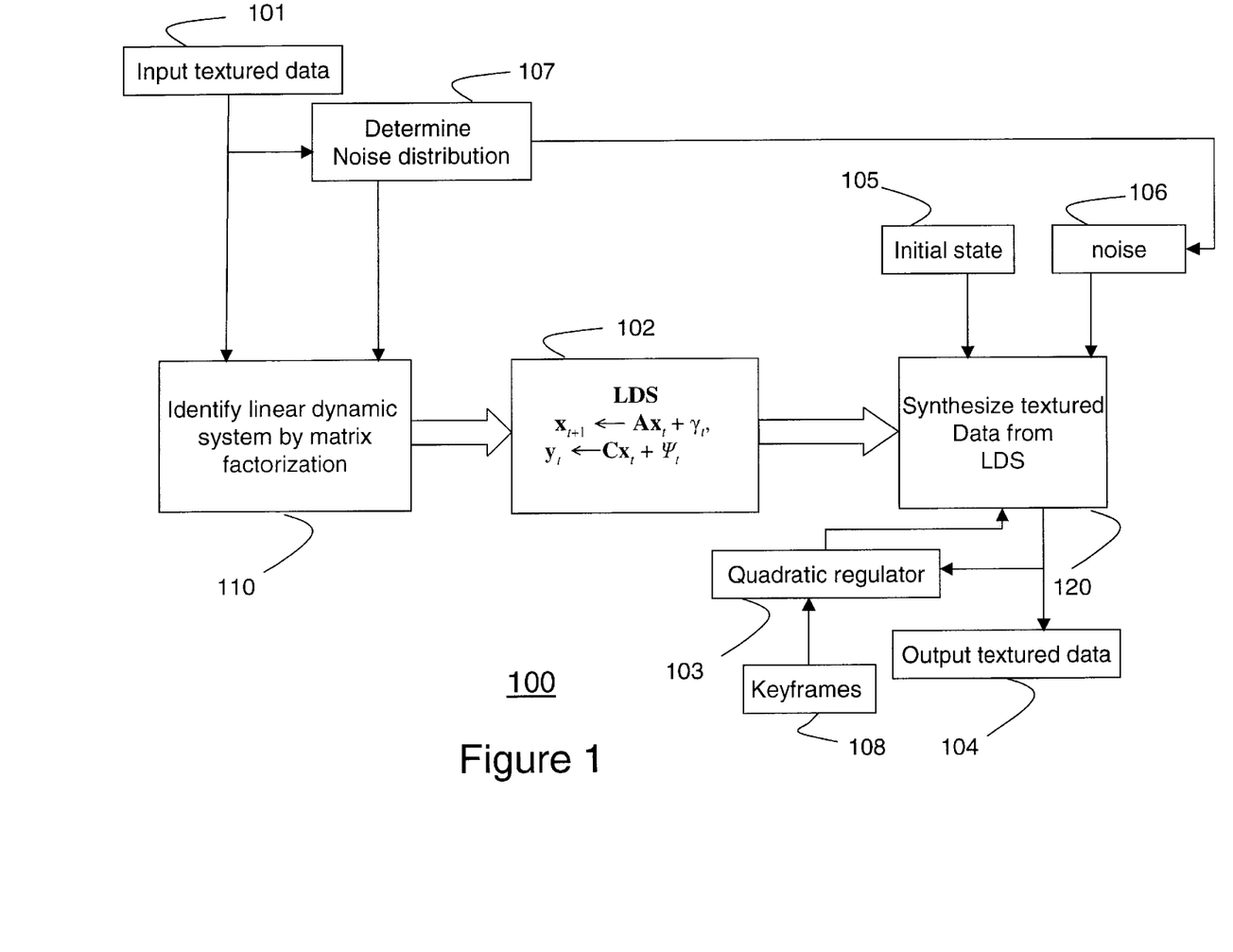
FIG. 1 is a flow diagram of a method for analyzing, synthesizing, and controlling textured data signals according to the invention.

As shown in FIG. 1, the invention provides a method 100 for processing temporal textured data signals according to the invention. The method 100 operates in two basic steps, system identification 110 and data synthesis 120. The method takes as input time-invariant, textured data 101. The input data are sampled to construct an observation matrix which is eigen-coded and factored using a singular value decomposition to identify 110 a linear dynamic system (LDS) 102 that models the time-invariant dynamics of the input data 101.

The linear dynamic system 102 is then controlled using a quadratic regulator 103 to synthesize essentially an unlimited amount of novel output textured data 104 that are substantially indistinguishable from the input data 101. During synthesis 120, the LDS 102 is run forward from an initial state 105 with a random noise signal 106 generated from estimated noise distributions 107 of the input data 101. In addition, the LDS 102 can be run forward or backward from keyframes 108 to pass through predetermined states at predetermined times.

System Identification

Figure 2:
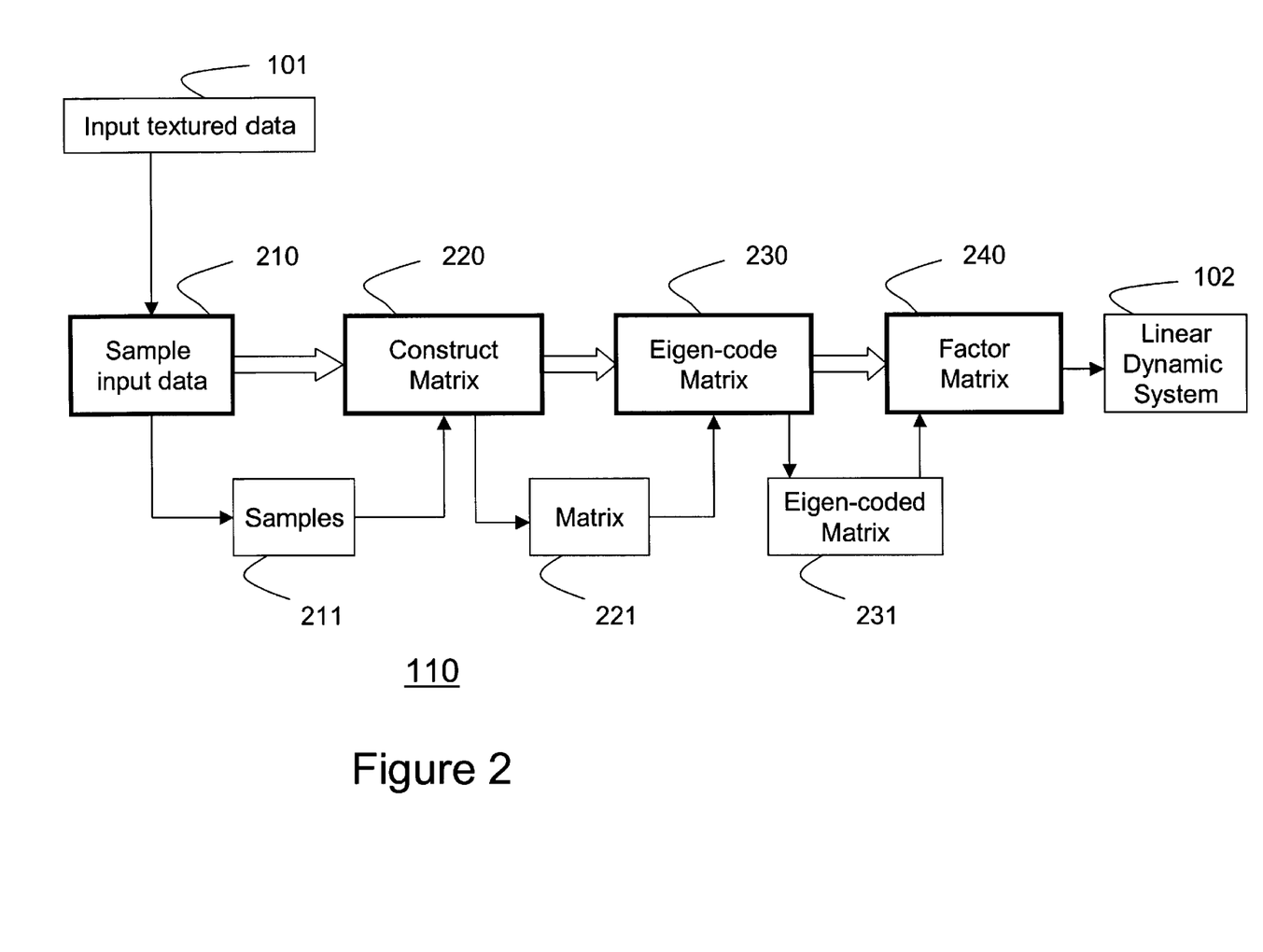
FIG. 2 is a flow diagram of identifying a linear dynamic system according to the invention.

We treat linear dynamic system identification 110 as a matrix factorization problem and concentrate on two properties, shift invariance and a balanced model. FIG. 2 shows the steps for identifying 110 a linear dynamic system 102. The input data 101 are sampled 210. Samples 211 are used to construct 220 an observation matrix 221 which is eigen-coded 230. An eigen-coded matrix 231 is factored 240 using a singular value decomposition to identify 110 the linear dynamic system (LDS) 102 that models the time-invariant dynamics of the input data 101.

Shift Invariance

Shift invariance is based on the fact that a dynamical path between two samples is predicted by a system matrix A. From state equations:

$$x_{t+1} \leftarrow Ax_t + \gamma_t, \text{ and} \quad (1)$$

$$y_t \leftarrow Cx_t + \psi_t, \quad (2)$$

it follows that $y_{t+k} = CA^k C^+ y_t$, modulo the effects of noise, where C+ is the pseudo-inverse of C. Therefore, in order to generate new data at a time t+k, it is necessary to estimate the system matrix A and the output matrix C.

In terms of texture synthesis, satisfying this criterion tends to guarantee that if a data frame, e.g., a video image or an acoustic sample, at time t is realistic, then frame t+k is also realistic.

In a balanced model, the channels in the state vector are uncorrelated over time, i.e., an expectation $E(x_t x_t^T)$ is diagonal, regardless of whether the observations are analyzed forward or backward in time. This is desirable because estimated parameters of a balanced LDS are relatively insensitive to perturbations in the input data. Here, we describe the strategy of the factorization according to the invention. The details are in Appendix A.

We begin with an eigen-coded observation matrix $Y_{d \times T}$ with columns of T d-dimensional samples. We next perform a QR-decompositions $$QR \overset{QR}{\leftarrow} \underline{Y}^T.$$

Each column of Q is a time-series of the normalized amplitude of one of the signal's modes of variation. This essentially decomposes the signal into a set of oscillators whose couplings determine the dynamics of the signal. Our goal is to model these couplings by finding the system matrix A that relates the past Q and the future Q as described in greater detail below.

We assume, without loss of generality, that $Y \doteq [y_1, y_2, \ldots y_T]$ is a zero-mean eigen-coding of the samples. The elements of each $y_t \in Y$ specify a weighted combination of an orthogonal linear basis that, when added to the sample mean, reconstructs a sample at time t. Furthermore, the rows of the matrix Y are sorted by variance, so that the first row explains most of the variation from sample to sample, and each successive row explains a lesser part of the residual. In the case of high-dimensional samples, such as images, eigen-codings give a lossless dimensionality-reduction of the data.

We use the notation $\underline{Y}$ and $\overline{Y}$ to distinguish matrices that refer the before and after, or the past and the future, respectively. For example, the before matrix is defined as $\underline{Y} \doteq [y_1, \ldots, y_{T-1}]$. The columns in the before matrix contain all but the last sample. The after matrix is defined as $\overline{Y} \doteq [y_2, \ldots, y_T]$. The columns in the after matrix contain all but the first sample. Assume for now that there exists an upper-triangular matrix R such that $\overline{W} \doteq \overline{Y}/R$ and $\underline{W} \doteq \underline{Y}/R$ are both orthogonal matrices. $\underline{W}$ is the subspace of the past, while $\overline{W}$ is the subspace of the future. The two spaces are related by the system matrix A, which must contain a rotation in order for the LDS to be balanced and stable, otherwise the state will inevitably explode or collapse. This establishes that the factorization is essentially an orthogonal Procrustes problem, in which we seek the rotation that most closely maps $\underline{W}$ onto $\overline{W}$.

The Procrustes problem is solved with an singular value decomposition (SVD):

$$USV^T \overset{SVD}{\leftarrow} \overline{W}^T \underline{W},$$

where the matrix S is the diagonal, and U and V are unitary matrices. From this, it can be shown that the rotation closest to $\overline{W}^T/\underline{W}^T$ is $V^T U$, see Golub et al., "*Matrix Computations*," Johns Hopkins U. Press, 1996. This is actually the core factor of the system matrix A. There are additional terms that appear in the course of satisfying the shift invariance property $\overline{Y}\underline{Y} = CAC^T = R^T \overline{W}^T / \underline{W}^{-T} R^{-T}$. The details of this are described in Appendix A.

In practice we use truncated subspaces in every step of the factorization. Because our matrices are all derived from SVD or eigen-analysis, the columns of $\underline{W}, \overline{W}$, U, and V are sorted according to how much of the variance in the input data they explain. Dropping the right-most low-variance columns offers lossy compression that substantially reduces the dimensionality of the LDS matrices and, up to a point, suppresses noise in the input data 101. In most data-modeling applications, this is typically done by examining the distribution of sorted eigen/singular values for strong discontinuity, which indicates that additional dimensions do not contain much information.

In the Procrustes problem, the singular values $\sigma_i \in \text{diag}(S)$ give information about the angles between past and future subspaces. From these, the mutual information between the past and future can be estimated by:

$$I(\overline{W}|\underline{W}) = -\Sigma_i^i \log(1 - \sigma_i^2).$$

A truncation can be estimated automatically for this expression. The truncation maximizes the mutual information between the past and future signal while minimizing the mutual information between the past and future noise, which, in ideal conditions, is zero.

Synthesizing from an LDS

Figure 3:
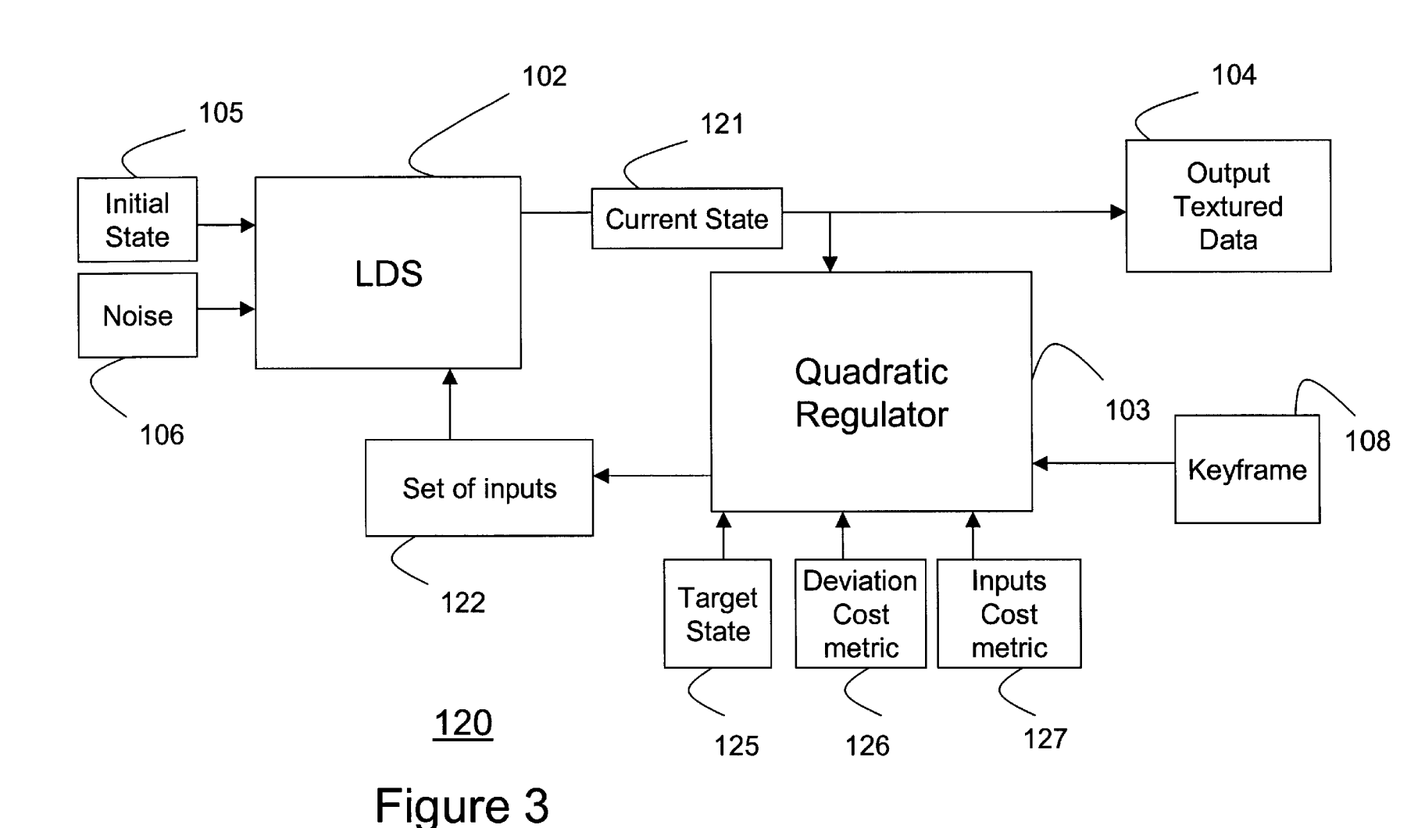
FIG. 3 is a flow diagram for controlled synthesizing according to the invention.

Referring now to FIG. 3, to synthesize 120 from the LDS 102, i.e., equations (1) and (2), are run forward from the initial state $x_0$ 105, with the random noise 106 generated from the estimated noise distributions 107. It is often useful to start with a state vector that is known to be valid, because not all points in state 4 space correspond to likely configurations. For example, the initial state $x_0$ 105 can be a state vector $X_T$ estimated for the last time-frame of the input data 101. In this case, the synthesized sequence rolls forward from the end of the input sequence. Alternatively, a random frame left out of the analysis 110 can be selected and projected into state space to obtain the initial frame $x_0$ 105.

Keyframing

The linear quadratic regulator (LQR) 103 is the optimal controller for the LDS 102. In one formulation, a target state k 121, a quadratic cost metric Q 122 for deviations from that state, i.e., the error, and a quadratic cost metric R 123 for applied inputs, i.e., energy, are specified. The LQR recursively determines a set of inputs 122 that drives the current state 121 toward the target state 125, minimizing a cost function $$\frac{1}{2}(x_T = k)^T Q(x_T = k) + \frac{1}{2}\sum_{t=1}^{T-1} u_t^T R u_t.$$

This is generalized for optimal tracking, where the goal is to make the state $x_t$ follow a path $k_t$:

$$\frac{1}{2}\sum_{t=1}^{T}(x_t = k_t)^T Q(x_t = k_t) + \frac{1}{2}\sum_{t=1}^{T-1} u_t^T R u_t.$$

For keyframing, we further generalize the optimal tracker to have a unique energy metric $R_t$, and an error metric $Q_t$ in each frame. This allows us to specify any number of keyframes or path segments, and specify how much effort is made to attain the keyframes or target states:

$$\frac{1}{2}\sum_{t=1}^{T}(x_t = k_t)^T Qt(x_t = k_t) + \frac{1}{2}\sum_{t=1}^{T-1} u_t^T R_t u_t.$$

The control law, which optimizes this cost function, is described in Appendix B.

Because the natural systems, e.g., videos of scenes and recorded sound effects that we are modeling do not have measurable inputs, the state noise channel 107 can be adapted to make the input noise channel 106 as follows.

Eigen-decompose $$V\Lambda V \overset{EIG}{\leftharpoonup} \sum \gamma,$$

and define the input matrix $B \doteq V\Lambda^{-1/2}$. This will transform the white Gaussian noise source 106 to have the same statistics as the state noise distributions 107. This also "encourages" the LQR to apply inputs whose $2^{nd}$-order statistics are not far from the state noise in the input sequence 101.

One problem with LQRs is that the lowest energy solution has increasingly large inputs as one approaches the key frames, resulting in a very obvious and unnatural-looking alteration of the system's natural dynamics. If the time between keyframes is large, then the lowest-energy solution may extinguish the state, which requires little energy, hold it to zero, then drive it to the target state right at the end.

Our formulation offers two solutions for this problem. By running the LDS backward from the keyframes and using the resulting states as a pre-keyframe targets with modest error costs, we can enforce a natural approach to each keyframe. Alternatively, we can make the energy costs grow increasingly large as a keyframe approaches, which forces the LQR to "plan ahead" by applying inputs in earlier frames, resulting in smaller and less noticeable perturbations of the system's natural dynamics. For example, we have used the latter strategy to force the system to land back on the initial state at a prespecified frame, generating video sequences of a turbulent phenomena that loop with no apparent transitions.

Configurational Constraints

A deeper problem with any purely dynamical model is that there is no means to enforce configurational constraints, except insofar as the dynamics lead to inherently correct configurations. The LDS 102 only specifies a gradient in the state space of the system; synthesis is a noise-driven walk along the gradient. There is nothing that prevents the state from wandering into invalid regions of configuration space, especially when the LDS is being controlled.

When estimating the LDS from short input sequences, we have the further problem that the state can wander into regions of state space that are valid, but the input sequence contains no information about how such points should be rendered. In this section we described how an LDS can be augmented with a probability density function (PDF) $p(x)$ defined over state space.

We also provide a non-linear quadratic regulator (NLQR), which exploits this PDF to ensure that the state does not move far from regions of state space that are known to be both valid and renderable. The details of the non-linear quadratic regulator are described in Appendix C.

The PDF can be a density function estimated from data, for example a mixture model. Alternatively, the PDF can be hand-designed to enforce physical constraints. For example, if the input texture data 101 are a sequence of images of a moving body, then a function of joint angles has zero density for impossible body poses. The density function can be arbitrarily complex with multiple maxima and minima. We only require that the density function p is twice differentiable.

The LQR is fundamentally a least-squares process, in which we recursively solve for the peak of a very high-dimensional quadratic form. Our basic strategy is to approximate the local curvature of log $p(.)$ at each point along the state trajectory with a quadratic form, and incorporate these into the error term of the LQR. In frames where there are no targets, we replace the error term $(x_t - k_t)^T Q_t (x_t - k_t)$ of the objective function with the log-likelihood $-\log p(x_t)$. The augmented LQR is then solved as conventionally.

Because the trajectory is not known in advance, the curvature is not approximated at the right points, so this procedure comprises a fixpoint that must be iterated to convergence. Because the density function can specify an arbitrarily complex set of constraints, we cannot be sure of a globally optimal solution in polynomial time. We can achieve a quasi-optimal solution with high probability with a practical amount of computation by deterministically annealing the density function. Here, the density function p is blurred out to a uniform density, the augmented LQR is solved, and then the augmented LQR is iteratively re-solved as the density function p is gradually deblurred, and the constraints achieve their full strength and detail.

Although deterministic annealing has interesting optimality properties in the limit of infinite precision and time, the important practical observation is that it leads to substantially higher quality solutions than the original fixpoint, often in less time. In our preferred embodiment, the density function p is a Gaussian mixture model (GMM) fitted to the state vectors $x_t$ via an expectation-maximization (EM) process. Typically, we are able to use very short annealing schedules, e.g., ten iterations of the LQR, partly because the estimated LDS 103 has good dynamics and does not wander far from the region of configuration space occupied by the original samples, and partly because the density function p is substantially smooth.

Data Representations and Example Applications

LDS modeling according to the invention succeeds to a degree that we can provide a representation of the input data that are linear, i.e., samples can be linearly interpolated, and normal because the noise process is Gaussian. For many raw input signal types, this can be approximately achieved through eigen-coding. The results are often good enough so that real input sequence 101 cannot be distinguished from the synthetic output sequence 104.

To eigen-code the input sequence 101, we form a matrix Z in which each column is one vectorized sample of the input data 101. The temporal average of the matrix Z is the mean of the columns. The temporal average is subtracted to make the matrix Z zero-mean. For a relatively square matrix Z, we eigen-code with an SVD $$USV \overset{SVD}{\leftharpoonup} Z,$$

setting $Y \leftarrow V$.

The sequence $\hat{Y}$ is decoded $\hat{Z} \leftarrow U\hat{Y}$ and then the mean is added back in. If the data have very high dimension, e.g., a video sequence, then we let Z be the zero-meaned video frames, and let $$V\Lambda V \overset{EIG}{\leftharpoonup} Z^T Z$$

be the temporal eigen-decomposition. Then the eigen-coding is $$Y \overset{EIG}{\leftharpoonup} \sqrt{\Lambda} V.$$

We can incorporate eigen-decoding directly into the output matrix C by estimating $C \leftarrow \underline{ZX^T}/(\underline{XX^T})$.

Motion from Video

In the case of acquiring motion parameters from the input video sequence, we estimate and extract translation parameters, and then rotation parameters. We determine incremental translations and rotations, remove any sequence-long trends, and convert rotations to three-parameter form. The residual articulatory motion is eigen-coded, essentially giving a sequence of morph weights. These we concatenate with the rotation and translation parameters, and this factored motion representation is then re-eigen-coded prior to system identification 110. The process is then reversed to obtain novel motion.

For example, to animate background characters in a crowd scene, an input sequence of four-hundred frames is acquired, with three-hundred points marked per frame, to generate a 15-dimensional eigen-coding, and obtain a 9-dimensional LDS from factorization. A random walk of the LDS can produced any number of frames of new crowd motion. The perceived articulatory motion is quite good, although the pose tends to wander more than in the input sequence because our representation favors accumulation of the rotations and translations. Interestingly, viewers tend to favor the motion in the synthetic sequence.

Audio

Five audio examples were selected from a sound effects library; namely, fire crackling, babbling brook, kettle boiling, crowd babble and wind through trees. The sounds were chosen for their textural composition. We use four seconds of audio for each example except for the wind through trees, which required ten seconds to capture slowly varying cycles.

Analysis

The representation used overlapping windowed frames that were transformed to a magnitude-only spectral representation using a discrete Fourier transform (DFT). The signals were sampled at 44.1 kHz and Hamming windowed in blocks of 1024 samples, i.e., frames of 23.2 ms. The windows were advanced by a step size of 256 samples yielding a frame rate of 172.2656 Hz. A radix-2 FFT was used to compute the DFT of each frame with an FFT-length, N=1024, corresponding to the block window length. Due to the symmetry of the DFT for real signals, only those values corresponding to the upper half of the unit circle were retained. This gives coefficients for angular frequencies in the range 0 to $\pi$ spaced by $2\pi/N$. This yields $d=N/2+1=513$ dimensional real-valued magnitude observation vectors, $|z_t|$. These observation vectors were then eigen-coded as above to produce $y_t$.

Synthesis

The audio representation was selected for its invertibility from a modified set of coefficients $|\hat{Z}|$ obtained by eigen-decoding the ouput Y, a random walk on the LDS 102. We denote $\hat{Z}$ because the set only contains magnitudes and it alone is not sufficient for determining a time-domain audio signal because it contains no phase information. To reconstruct the full complex spectrum, the magnitude only observations were combined with normally-distributed initial phases. The full spectrum was derived by conjugating and reflecting the trailing N/2 rows of $\hat{Z}$, thus yielding a complete spectrum estimate $$\hat{\hat{Z}} = [\hat{Z}\hat{Z}^*_{d:-1:2}],$$

where * denotes a complex conjugate.

The phase component was iteratively re-estimated using a least mean squares (LMS) window estimation method, see Griffin et al., "Signal estimation from modified short-time Fourier transform," *IEEE-Transactions on Acoustics, Speech and Signal Processing,* 32:236–243, 1984. Within ten or so iterations, the phase angles converged to minimize the mean-square error between the specified magnitude spectrum and the magnitude of the complex spectrum after undergoing inverse and forward Fourier transforms. This technique is well suited to estimating phases for audio textures, which are noise-based and tightly constrained by the distribution of magnitudes. The results ranged from excellent to satisfactory for the five selected audio examples.

Video

With a camcorder, three to eight second videos of natural scenes were acquired, e.g., a steaming teapot, pouring water, rippling water in a pan, fire viewed through glass, river surface, blowing treetops, flowers, wind-flapped tent, swaying reeds, etc. These scenes show turbulent motion driven by wind or by heat flow. Most of these scenes are very complex, featuring loosely coupled motion of hundreds of objects, e.g., branches or grass, or even wholly decoupled motion of several objects.

Each frame of the input video is represented as a long column vector of RGB color values. The resulting matrix is eigen-coded and factored to yield the LDS. The resulting system matrices ranged from forty to one-hundred and sixty dimensions, depending on the complexity of the scene dynamics. We then synthesized a novel video from a random walk on each LDS, using as the initial frame a selected random frame from the input video that was not included in the analysis. Even though the synthesized videos are considerably longer than the originals, they do not contain any repeated or original frames.

The output sequences were realistic, with the main problem being slight blurring of frames when the LDS correctly extrapolates the dynamics of the system but the correct mapping of state to appearance is not contained within the image subspace of the original video. Characteristically, this happens when the original video contains enough samples to estimate the system dynamics but not enough images to span the space of system appearances. Due to our eigen-representation, the LDS is actually modeling fluctuations in pixel intensities. In input sequences with many small features, e.g., leaves, that make small motions or reflectance changes, this is an effective representation.

We estimated a twenty-component Gaussian mixture model density p(x) over the state vectors $x_t$, then used the non-linear quadratic regulator to synthesize an output sequence in which the state is controlled to return to the initial conditions after three-hundred frames. The additional configural information captured by the density compensates for deficiencies in the dynamical information available in the input sequence, so much so that even with the control signal, the results look considerably better than anything produced by an unfettered random walk on the LDS.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

APPENDIX A

System identification

We begin with our eigen-coded observation matrix Y and make the QR-decompositions $$\underline{Q}\underline{R} \stackrel{QR}{\leftarrow} \underline{Y}^T$$

and similarly $$\underline{Q}\underline{R} \stackrel{QR}{\leftarrow} \underline{Y}^T.$$

Each column of Q is a time-series of the normalized amplitude of one of the signal's modes of variation. This essentially decomposes the signal into a set of oscillators whose couplings determine the dynamics of the signal. Our goal is to model these couplings by finding a system matrix A that relates the past Q and the future Q. The main complication is that Q and Q are not mutually consistent models of the past and future because they decompose the signal with regard to inconsistent R 6=R.

To minimize this inconsistency, let J be an orthogonal matrix that minimizes $\|J^T\overline{R}-J$ (Frobenius norm). Since rotations preserve the Frobenius norm, $J^2$ is the solution to the orthogonal Procrustes problem $J=\arg\min_J \|J(J^T\overline{R}-J\underline{R})\|_F = \arg\min_J \|\overline{R}-J^2\underline{R}\|$ obtainable via SVD:

$$U_J S_J V_J^T \stackrel{SVD}{\leftarrow} \overline{R}\underline{R}^T \quad (3)$$

$$J \leftarrow (U_J V_J^T)^{1/2} \quad (4)$$

We use J to define revised QR-decompositions, $(\overline{Q}J)(J^T\overline{R})=\overline{Y}^T$, $(\underline{Q}J^T)(J\underline{R})=\underline{Y}^T$. Define $\underline{W}\doteq(\underline{Q}J^T)$, $\overline{W}\doteq(\overline{Q}J)$, and $R\doteq(J^T\overline{R}+J\underline{R})/2$. $\underline{W}$ and $\overline{W}$ are subspaces of the past and future that are consistent in that they give minimum Frobenius-error reconstructions of the data with regard to R.

The shift invariance property can be rewritten as the following factorization problem:

$$\overline{Q}^T\underline{Q} = \overline{R}^{-T}[CAC^+]\underline{R}^T \quad (5)$$

To factor A and C we set up an orthogonal Procrustes problem seeking the rotation that takes the subspace of the past into the subspace of the future. This begins with the singular value decomposition, $$USV^T \stackrel{SVD_r}{\leftarrow} \overline{W}^T\underline{W}^{-T} = (\overline{Q}J)^T(\underline{Q}J^T)^{-T} = J^T\overline{Q}^T\underline{Q}J^T, \quad (6)$$

where r is the order of the system and the matrices $\overline{W}$ and $\underline{W}$ have been truncated to the first k columns (corresponding to the k dominant eigenmodes in the original data). This is partly motivated as noise-suppression, and partly motivated by the fact that the amount of information in A will be determined by the subspace angle between $\overline{W}$ and $\underline{W}$.

Now we expand the SVD into the desired factorization:

$$\overline{Y}/\underline{Y} = \overline{R}^T\overline{Q}^T\underline{Q}\underline{R}^{-T} \quad (7)$$

$$= \overline{R}^T(JJ^T)\overline{Q}^T\underline{Q}(J^TJ)\underline{R}^{-T} \quad (8)$$

$$= \overline{R}^T J(\overline{W}^T\underline{W})J\underline{R}^{-T} \quad (9)$$

$$= \overline{R}^T J(USV^T)J\underline{R}^{-T} \quad (10)$$

$$= \overline{R}^T J(V\sqrt{S^{-1}}\sqrt{S}V^T)(U\sqrt{S}\sqrt{S}V^T)J\underline{R}^{-T} \quad (11)$$

$$= \underbrace{\overline{R}^T V\sqrt{S^{-1}}}_{C}\underbrace{\sqrt{S}V^T U\sqrt{S}}_{A}\underbrace{\sqrt{S}V^T\underline{R}^{-T}}_{C^+} \quad (12)$$

equation 12 becomes an equality as $t\to\infty$; otherwise our solution for R ensures that the approximation has minimal Frobenius error. A has interesting structure: $V^T U$ is the solution to the orthogonal Procrustes problem rotating $\underline{W}$ into $\overline{W}$, while diag(S) are the canonical correlations—cosines of the angles between corresponding columns in the past and future subspaces.

In contrast to the subspace system identification methods cited above, we estimate all LDS parameters without computing the hidden state. However the above equations can also be solved for X:

$$\underline{X} \doteq C^+\underline{Y} = \sqrt{S}V^T J\underline{Q}^T \quad (13)$$

$$\overline{X} \doteq C^+\overline{Y} = \sqrt{S}V^T J^T\overline{Q}^T \quad (14)$$

Since we have two overlapping estimates of the state X, we set $X\doteq[\underline{x}_1,\ldots,\underline{x}_t,\overline{x}_t,\ldots,\overline{x}^\tau]$, for any $1\leq t\leq T$. In what follows it is convenient to set t=T. In the limit of infinite data, $\underline{X}$ and $\overline{X}$ become perfectly consistent. In practice the subspace angle between the two estimates is quite small (e.g., $10^{-8}$ radians), indicating strong consistency.

Using the expressions for X, we find that the scatter of the past and future state estimates, $\underline{X}\underline{X}^T=\overline{X}\overline{X}^T=S$, are diagonal and equal, indicating that the estimated LDS is balanced and therefore insensitive to small data perturbations. Strictly speaking, the system is only approximately balanced for finite T, because $XX^T$ has nonzero but very small off-diagonal elements, but the approximation is tight. The system residual $$\Gamma \doteq \overline{X} - A\underline{X} = \sqrt{S}V^T J^T(\overline{Q}^T - \underline{Q}^T\underline{Q}\underline{Q}^T) \quad (15)$$

$$= \sqrt{S}V^T\overline{W}^T(I-\underline{Q}\underline{Q}^T) \quad (16)$$

$$= \overline{X}(I-\underline{Q}\underline{Q}^T) \quad (17)$$

is the component of the future that is orthogonal to the past. For high-dimensional data, equation 15 shows that for any dimensionality-reduction of the system by truncating columns of Q, the error associated with system matrix A is the projection of the state into the subspace of the discarded columns. Since the retained columns are very close to the dominant eigenvectors of the original data (with equality at t>>d), the optimal truncation property of the original SVD-carriers through to our parameter estimates.

The output residual $$\Psi = \underline{Y} - C\underline{X} = (J\underline{R} - R)^T\underline{Q}^T = (J\underline{R} - J^T\overline{R})^T\underline{Q}^T/2 \quad (18)$$

is essentially the residual (if any) after $\underline{R}$ is rotated into $\overline{R}$. Note that by estimating the optimal rotation J we have explicitly minimized the output residual, thereby optimizing the fidelity of the outputs to the the original data. This gives us a significant practical advantage over the prior art in subspace identification methods.

Finally, the noise covariances are $$\Sigma_\gamma = \text{cov}(\Gamma) = \Gamma\Gamma^T/(T-1) \tag{19}$$

$$\Sigma_\psi = \text{cov}(\Psi) = \Psi\Psi^T/T. \tag{20}$$

Higher-order models

This method is built on first-order shift invariance; higher-order models are more appropriate for processes whose state vector may have more dimensions than their observation vector, and therefore carry more state from frame to frame. To estimate these models one constructs stacked before and after matrices, e.g., $$\underline{Y} \doteq \begin{bmatrix} y_1 & y_2 & \cdots & y_{T-2n} \\ \vdots & \vdots & & \vdots \\ y_n & y_{n+1} & \cdots & y_{T-n} \end{bmatrix} \overline{Y} \doteq \begin{bmatrix} y_{n+1} & y_{n+2} & \cdots & y_{T-n} \\ \vdots & \vdots & & \vdots \\ y_{2n} & y_{2n+1} & \cdots & y_T \end{bmatrix},$$

then one factors as above and takes $n^{th}$ root of A.

APPENDIX B
Generalized linear quadratic regulator

Often it is desirable to control the system so that it passes through pre-specified states at certain times; this is equivalent to key-framing in animation. Our generalized linear quadratic regulator (LQR) computes a series of LDS inputs $\{u_t\}_T^{T-1}$ that minimize the cost function $$\frac{1}{2}\sum_{t=1}^T (x_t - k_t)^T Q_t (x_t - k_t) + \frac{1}{2}\sum_{t=1}^{T-1} u_t^T R_t u_t, \tag{21}$$

by minimizing a distance between the state path $\{x_t\}_t$ and some prespecified path $\{k_t\}_t$ with respect to metrics $\{Q_t\}_t$ on state error and $\{R_t\}_{t=1}^{T-1}$ on inputs. If only the end-state target $k_T$ is known, then we set $Q_{t<T} \leftarrow 0$. In industrial applications, a simplified LQR is typically used to drive the state vector to zero as fast as possible using minimal inputs (e.g., $\forall_t k_t = 0$, $Q_t = Q$). In our generalization, the optimal inputs $\{u_t\}_{t=1}^{T-1}$ are calculated via dynamic programming using a backward Riccati recursion from t=T-1 to t=1:

$$G_t = [R_t + B^T P_{t+1} B]^{-1} B^T \tag{22}$$

$$K_t = -G_t P_{t+1} A \tag{23}$$

$$w_t = -G_t v_{t+1} \tag{24}$$

$$v_t = A^T(v_{t+1} + P_{t+1} B w_t) \tag{25}$$

$$P_t = Q_t + A^T P_{t+1}(A + BK_t) \tag{26}$$

with initial conditions $P_T = Q_T$, $v_T = -P_T k_T$ to yield the optimal control law $$u_t(x_{t-1}) = K_t x_{t-1} + w_t. \tag{27}$$

To synthesize virtual data, state equations 1–2 are iterated forward with equation 27 from an initial x0. The results have natural dynamics, but because the LDS contains no information about natural configurations (beyond the stationary distribution of A) the controller may force the system through unnatural regions of configuration space.

APPENDIX C
Exploiting a state-space density

Let us assume a density p(x) describing the regions of state space that are naturally visited by the system. p may be estimated from examples or derived from a known system model. For non-keyframes, we would like to replace the error term $(x_t - k_t)^T Q_t (x_t - k_t)$ in equation 21 with the energy—log $p(x_t)$, but equation 21 becomes strongly nonlinear and is unsolvable via direct methods. For example, p can represent an arbitrarily hard maze problem by assigning zero density to the regions of state space corresponding to the walls of the maze. To make use of the machinery of equations 22–27, we must find a local quadratic approximation of log p in the area of $x_t$ for non-keyframes. The problem is that these $x_t$ are unknown. We propose the following refinement strategy:

1. Take an existing low-probability solution for the state-space trajectory, fit a quadrat to—log p in the neighborhood of each $x_t$ to obtain a unique $k_t$, $Q_t$ for each t, then solve for a higher-probability $\{x_t\}'_t$, using equations 22–27.
2. Iterate this refinement in a continuation where we begin with a uniform non-constraining density and gradually move through sequence of more accurate and detailed approximations of p until we solve with regard to p itself.

.1 Fitting a quadratic

The Taylor expansion of log p(x) around $x_t$ is $$c_0 + (x - x_t)^T D_t + (x - x_t)^T H_t (x - x_t)/2 + O(\|(x - x_t)\|^3) \tag{28}$$

where $D_t$, $H_t$ are the gradient and hessian (1st & 2nd derivatives of log p at $x_t$, which we calculate as $$D \doteq \frac{d\log p(x)}{dx} = \frac{1}{p(x)}\frac{dp(x)}{dx} \tag{29}$$

$$H \doteq \frac{d^2 \log p(x)}{dx dx^T} = \frac{1}{p(x)^2}\left(\frac{d^2 p(x)}{dx dx^T} p(x) - \frac{dp(x)}{dx}\frac{dp(x)}{dx^T}\right) \tag{30}$$

These specify the quadratic form $$\log p(x) \approx (x - x_t)^T H(x - x_t)/2 + (x - x_t)^T D + c_1 \tag{31}$$

$$= (x - k_t)^T Q_t (x - k_t)/2 + c_2 \tag{32}$$

with last equality satisfied by the settings $$Q_t = H, k_t = x_t - H^{-1} D. \tag{33}$$

To use this quadratic, a unique $Q_t$, $k_t$ is computed for each $x_t$ and the results is plugged into equations 22 & 26. The next interation of dynamic programming produces a new and more probable series $\{x_t\}'_t$.

Continuation

Iterated, the above procedure converges to a fixpoint with a state-space trajectory having locally maximal probability and requiring minimal energy inputs. The quality of the local optimum is determined entirely by the initial conditions. This can be substantially improved without increasing computational cost by the method of continuations, in which the constraints imposed by p are gradually introduced over the course of several iterations. In the method of continuations, a "hard" function p is blended with an "easy" function q to give a function B(p, q, i) which varies according to blend parameter i. We will adopt the convention that B(p, q, 1)=p and B(p, q, 0)=q. The blend varies from i=0 to i=1 over the course of several optimizations, using the result of each optimization as an initialization for the next. Density blends can generally be massaged into the form $B(p, q, i) \propto p^i q^{1-i} = \exp(i \log p + (1-i) \log q)$, a linear blend in the log-domain. We will work with the simplest q=U, a uniform distribution that imposes no constraint.

Example: Gaussian mixture models

A gaussian mixture model (GMM) is a universal function approximator with a particularly simple form $$p(x) = \Sigma_j^n w_j N(x | \mu_j, \Sigma_j) \tag{34}$$

$$N(x | \mu, \Sigma) = \exp - 1/2 \, [\log|2\pi\Sigma| + (x-\mu)^T \Sigma^{-1}(x-\mu)] \tag{35}$$

A GMM can be fitted to data via the expectation-maximization procedure. The gradient and hessian of log p(x) are $$\frac{d \log p(x)}{dx} = \frac{1}{p(x)} \Sigma_j w_j \Sigma_j^{-1}(\mu_j - x) N(x | \mu_j, \Sigma_j), \tag{36}$$

$$\frac{d^2 \log p(x)}{dx dx^T} = \frac{1}{p(x)} \Sigma_j w_j (\Sigma_j^{-1} + \Sigma_j^{-1}(\mu_j - x)(\mu_j - x)^T \Sigma_j^{-1}) N(x | \mu_j, \Sigma_j) - \frac{1}{p(x)^2} \Sigma_j w_j \Sigma_j^{-1}(\mu_j - x)(\mu_j - x)^T \Sigma_j^{-1} N(x | \mu_j, \Sigma_j)^2. \tag{37}$$

To effect the continuation, we can define any blend, e.g., $B(p, U, i) = p(x) | i$ with parameters $$w_j | i = w_j^i / \Sigma_j w_j^i \text{ or } (w_j + 1/i - 1)/\Sigma_j(w_j + 1/i - 1) \tag{38}$$

$$\mu_j | i = \mu_j \text{ or } i\mu_j \tag{39}$$

$$\Sigma_j | i = \Sigma_j^{1/i} \text{ or } \Sigma_j/i \text{ or } \Sigma_j + I/i \tag{40}$$

any combination of which yields a properly normalized continuous density. We currently use the last alternative in each of equations 38–40. Note that setting $p(x)|i = p(x)^i$ merely scales the gradient and hessian by i, whereas the continuations proposed above make information about the energy surface nonlocal by smearing out its features.

Nonlinear Quadratic Regulator algorithm

The nonlinear quadratic controller is thus 1. (Optional) Choose a subset K of frames and assign keyframe values $k_{t \in K}$ and distance costs $Q_{t \in K}$.
2. Set i=0 and compute an unconstrained optimal path $\{x_t\}_t$ with $Q_t=0$ for all non-keyframes.
3. Loop while gradually increasing i to 1,
   (a) Calculate gradients $D_t$ and hessians $H_t$ from $B(p, q, i)$ at each $x_t$ for non-keyframes.
   (b) Calculate $Q_t$ and $k_t$ from $H_t$, $D_t$ as per equation 32.
   (c) Compute a new optimal path $\{x_t\}_t | i$.
4. Compute outputs $\{y_t\}_t$ from $\{x_t\}_t | i=1$.

I claim:

1. A method for generating a synthetic textured data signal, comprising:

acquiring a time-invariant input textured data signal including a sequence of frames;

sampling the input textured data signal to construct an observation matrix;

eigen-coding and factoring the observation matrix to identify a linear dynamic system modeling the input textured data signal; and running the linear dynamic system forward from an initial state using a quadratic regulator and a random noise signal to generate the synthetic textured data signal, further comprising;

selecting a set of keyframes from the sequence, each keyframe having an associated state at a particular time; and running the linear dynamic system through the keyframes to pass through predetermined states at predetermined times.

2. The method of claim 1 wherein the input textured data signal includes a sequence of frames, and the initial state is estimated from a last frame of the sequence.

3. The method of claim 1 wherein the input textured data signal includes a sequence of frames, and the initial state is estimated from a random frame of the sequence.

4. The method of claim 1 further comprising:

estimating the random noise signal from an estimated noise distributions of the input textured data signal.

5. The method of claim 1 wherein the quadratic regulator is linear.

6. The method of claim 1 wherein the quadratic regulator is non-linear.

7. The method of claim 6 wherein the non-linear quadratic regulator is modeled by a probability density function.

8. The method of claim 7 wherein the probability density function is a Gaussian mixture model.

9. The method of claim 1 wherein the input textured data signal is an acoustic signal.

10. The method of claim 1 wherein the input textured data signal is a video sequence of a natural scene.

11. The method of claim 1 wherein the input textured data signal is a video sequence, and further comprising:

acquiring motion parameters from the input video sequence;

estimating and extracting translations and rotations from the motion parameters to produce residual articulatory motion;

eigen-coding the residual articularly motion to produce a sequence of morph weights; and concatenating the morph weights with the rotation parameters and the translation to produce the observation matrix.

* * * * *